US006234540B1

(12) United States Patent
Drijver et al.

(10) Patent No.: US 6,234,540 B1
(45) Date of Patent: May 22, 2001

(54) SEALING ARRANGEMENT

(75) Inventors: Frans Pieter Drijver, Stabekk (NO); Tarlochan S. Mann, Nortridge, CA (US)

(73) Assignee: Single Buoy Moorings Inc., Marly (CH)

( * ) Notice: Subject to any disclaimer, the term of this patent is extended or adjusted under 35 U.S.C. 154(b) by 0 days.

(21) Appl. No.: 09/341,996

(22) PCT Filed: Dec. 16, 1998

(86) PCT No.: PCT/NL97/00699

§ 371 Date: Nov. 15, 1998

§ 102(e) Date: Nov. 15, 1998

(87) PCT Pub. No.: WO98/31963

PCT Pub. Date: Jul. 23, 1998

(30) Foreign Application Priority Data

Jan. 22, 1997 (GB) .................................... 9701282

(51) Int. Cl.⁷ .............................. F16L 39/04; F16L 15/48
(52) U.S. Cl. ................... 285/98; 285/121.1; 285/121.5; 403/78; 277/558; 277/572
(58) Field of Search ..................................... 277/549, 558, 277/566, 431; 285/98, 121.1, 121.3, 121.4, 121.5; 403/78, 164, 165

(56) References Cited

U.S. PATENT DOCUMENTS 3,279,806    10/1966  Bialkowski .
4,555,118  * 11/1985  Saliger .
4,602,806  *  7/1986  Saliger .
4,626,003  * 12/1986  Williams et al. .
4,647,076  *  3/1987  Pollack et al. .
4,647,077  *  3/1987  Ethridge et al. .
4,828,292  *  5/1989  Jansen .
4,925,219  *  5/1990  Pollack et al. .
5,242,198  *  9/1993  Pollack .
5,411,298  *  5/1995  Pollack .
5,788,288  *  8/1998  Jostein .
6,073,777  *  6/2000  Jansen .

FOREIGN PATENT DOCUMENTS 2 538 875     7/1984  (FR) .
WO 86/00972   2/1986  (WO) .
WO 90/02289   3/1990  (WO) .

* cited by examiner

Primary Examiner—Anthony Knight
Assistant Examiner—Vismal Patel
(74) Attorney, Agent, or Firm—Young & Thompson

(57) ABSTRACT

A sealing arrangement (6, 20, 37) to be positioned between two adjacent members (2, 3; 12, 13; 26, 27) between which a fluid cavity (4) is defined. Such a sealing arrangement is by example used in a swivel structure. If the exerted pressure is considerable two members will move from each other resulting in a larger spacing of the gap between them. During increasing of the pressure the requirements set to sealing do increase. According to the invention it is proposed to provide the members (2, 3; 12, 13; 20, 27) with L-shaped extensions and inverted L-shaped extensions (10, 11; 19, 21; 29, 30; 34, 35) which engage into each other and in between a spacing is defined for accommodating the sealing. If the pressure of the fluid in the cavity arises the spacing for the sealing will substantially decrease.

16 Claims, 5 Drawing Sheets

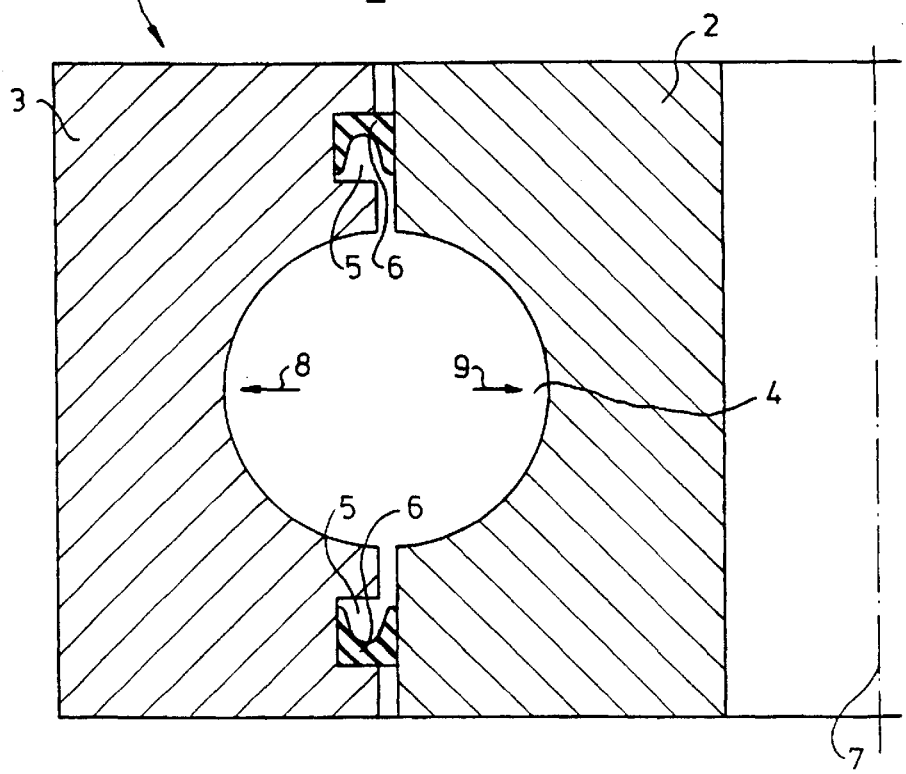
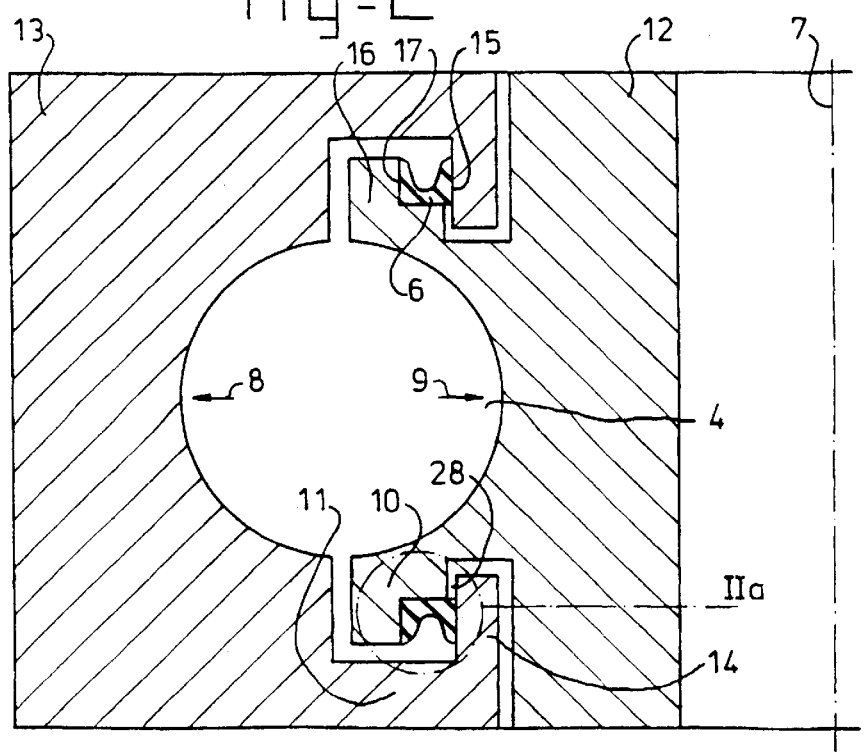

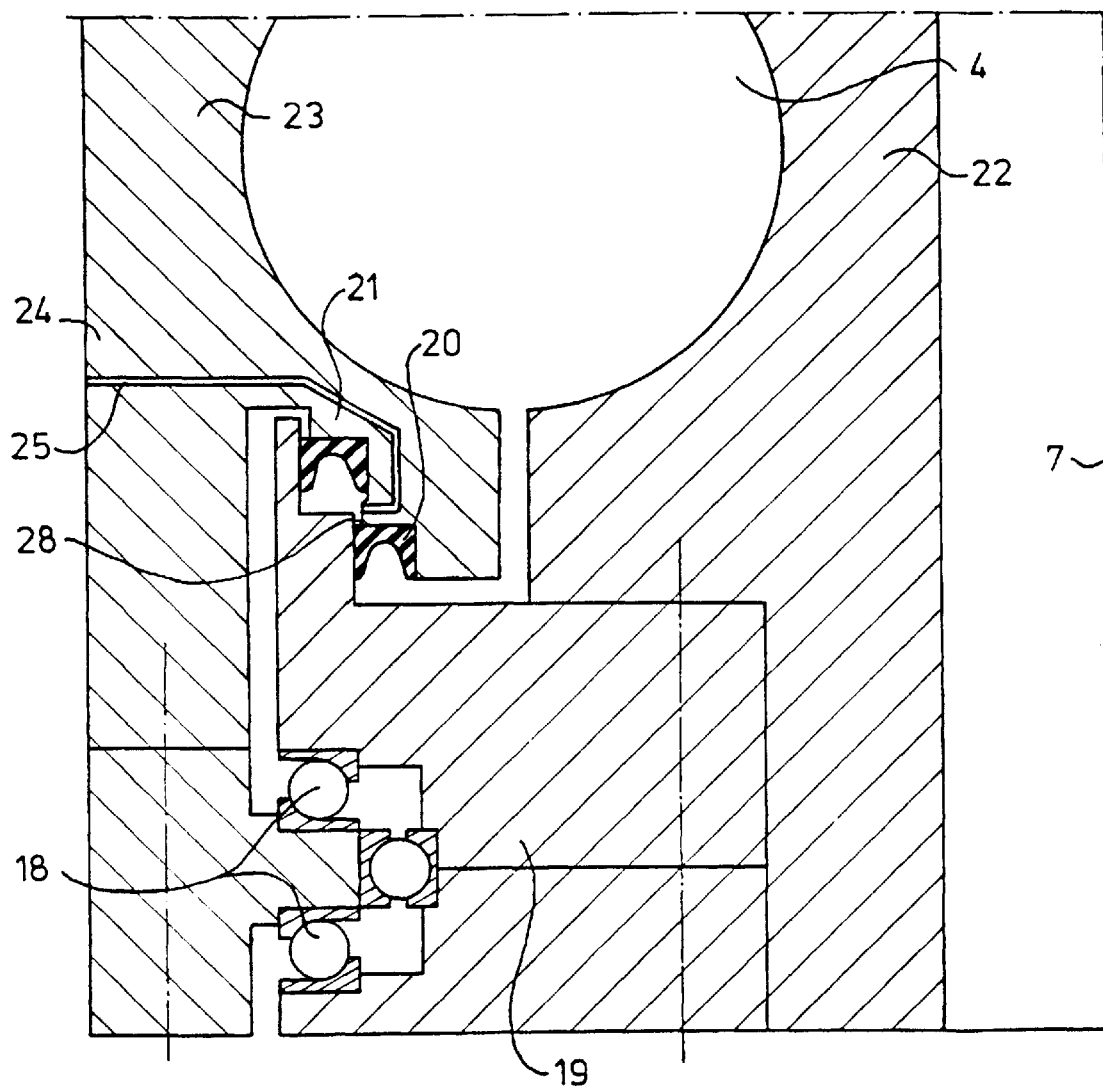

SEALING ARRANGEMENT

The invention relates to a sealing arrangement, in particular for use in fluid swivels, which are used in offshore installations to transfer fluids between fixed underwater pipe lines and floating vessels which may weathervane around earth-fixed installations. The sealing arrangement according to the invention, makes it possible to pressurize the fluid to be sealed to a relatively high pressure between the two swivel members without extrusion of the seals and at pressures fluctuating from ambient to a relatively high pressure without crazing or cracking of the seals.

BACKGROUND OF THE INVENTION

Sealing arrangements are used in fluid swivels. Such fluid swivels are used in offshore installations to transfer fluids between fixed underwater pipe lines and floating vessels which may weathervane around earth-fixed installations. Fluids can be withdrawn from a well head or can be introduced or can be loaded/offloaded or used for power and control of equipment.

A typical fluid swivel includes at least two swivel members comprising ring-shaped inner and outer walls forming an annular chamber between them and forming cylindrical clearances at each side of the chamber between the fixed and rotating wall members. Several circular grooves are provided in the cylindrical clearances to hold an arrangement of piston or rod seals at each side of the fluid chamber.

In order to transfer a large number of separate fluid lines of small to large pipe diameter sizes, several swivel modules are assembled together in a stack. The lowest swivel path of a swivel assembly requires a relatively large sealing diameter to provide sufficient space in the centre of its inner ring to guide the entry piping of the above situated swivels. This sealing diameter of the lowest swivel path increases with the total fluid throughput of a complete swivel assembly.

The first point at which problems occur during increasing of the pressure is at the sealing of the clearance between the two swivel members. The seal grooves and the clearances widen as the fluid pressure increases, because the inner and outer walls of the swivel are driven apart by the fluid pressure. The growth of seal groove widths and the clearances may lead to the allowable extrusion gap size of the seals being exceeded and consequently result in extrusion of the seal in the extrusion gap and/or in cracking of the seals.

It is possible to address the extrusion problem by decreasing the initial clearance between the two members in the none-pressurized condition and by making the inner and outer swivel rings sufficiently rigid. However, this will result in a risk of interference during differential temperatures of the inner and outer parts, a sharp increase of material costs because the stiffening results in very massive swivels, which jeopardises the feasibility particularly when a large sealing diameter is required.

From U.S. Pat. No. 4,828,292 and U.S. Pat. No. 4,925,219 a sealing assembly is known wherein face seals are used. Face seals engage to opposite surfaces being parallel to the direction of displacement of the two swivel members and a surface of one of the swivel members, said surface being parallel to the axis, so that the face seals are oriented between flat surfaces rather than cylindrical surfaces as piston or rod seals. The axial distance between the sealing surfaces remains essentially constant despite any radial deflection of the inner and outer swivel part caused by increase or decrease of fluid pressure, so that the extrusion gaps of the face seals are hardly affected by the fluid pressure. For this reason, swivel designs using these face seals do not require large wall section thicknesses to limit the radial deflections and can, therefore, be designed for strength rather than for stiffness.

Swivels based on face seals, however, require several inner and outer rings to create the grooves for their seals. These rings and the swivel bearing are to be machined with very high axial tolerances to limit the initial seal gap tolerances as result of the accumulated machining tolerances. The large number of swivel rings and the high machining tolerances result in high fabrication costs.

SUMMARY OF THE INVENTION

The invention aims to provide a sealing arrangement for two adjacent members being displaceable with regard to each other, such as a swivel. It must be possible to pressurize the fluid to be sealed to a relatively high pressure between the two swivel members without extrusion of the seals and at pressures fluctuating from ambient to a relatively high pressure of 2000 psi or more without crazing or cracking of the seals.

According to the present invention a sealing arrangement is provided between an inner member and a outer member of the swivel. The members are adjacent and can be rotated with respect to one and another around a common central axis. The members define between them at least one circumferentially extending torroidal fluid cavity which is in communication with fluid lines through inner and outer members respectively. A circumferential gap between the inner and outer member is in communication with the fluid cavity and has two gap sections each located at a different distance from the central axis. An intermediate gap section connects the first and second gap sections and extends in a generally radial direction. The sealing means are located in the groove of the inner and/or outer member and bridge the gap section to seal the cavity. The improvement is that the inner and the outer member in the area of the circumferential gap each comprise a radially extending arm. The arms overlap both in the axial and in the radial direction and define the intermediate gap section there between. The intermediate gap section at least partly extends in the axial direction at is bridged by the sealing means such that widening of the upstream part of the gap by pressure in the cavity reduces the width of the intermediate gap section and increases the pressure on the sealing means.

According to a further aspect of the invention the circumferentially extending space or gap for the sealing means has an additional space upstream of the sealing means between sealing means and cavity, within which a double sealing means assembly has been provided of the type with U-shaped means spaced apart from each other and with in between a space connected to a source of pressure via a bore, wherein the space of the gap between the sealing means and the double sealing means assembly might be connected as well to a pressure source via a bore. The increased pressure on the double sealing means provides for improved gas tightness, a clean environment (i.e. without hydrocarbons being present), lubrication and hence contributes to an increase seal life.

According to a further aspect of the invention each arm of the sealing arrangement comprises an axially extending free leg. The sealing means can be placed at least partly between said legs. To provide the improved sealing, two sealing means may be present on each side of at least one leg such that a primary seal and a secondary seal are formed. The free legs may have a stepped surface such that recesses or cavities are formed wherein the sealing means can be positioned.

The opposing surfaces of the arms need not extend completely in the axial direction, but each arm may alternatively comprise a substantially wedge-shaped portion having a slanting surface, the intermediate gap section being formed between the slanting surfaces of the arms. By increasing or decreasing the angle of the slanting surfaces, the amount by which the gap section is closed upon pressure variations in the fluid can be adjusted.

The legs of the substantially L-shaped extension can enclose an angle of substantially 90° or an angle substantially less than 90°. The sealing means can comprise a rod seal, piston seal, face seal or conical seal or a combination of them.

BRIEF DESCRIPTION OF THE DRAWINGS

The invention will be further elucidated referring to several embodiments of the invention shown in the drawings, wherein:

FIG. 1 shows a detail of a prior art swivel;

FIG. 2 shows in cross section a first principal embodiment of the invention in the form of a single seal arrangement;

FIGS. 2b and 2c show alternative embodiments of the detail according to FIG. 2a;

FIGS. 3 to 6 each show in cross section other embodiments of the invention.

DETAILED DESCRIPTION OF THE INVENTION

Figure 2A:
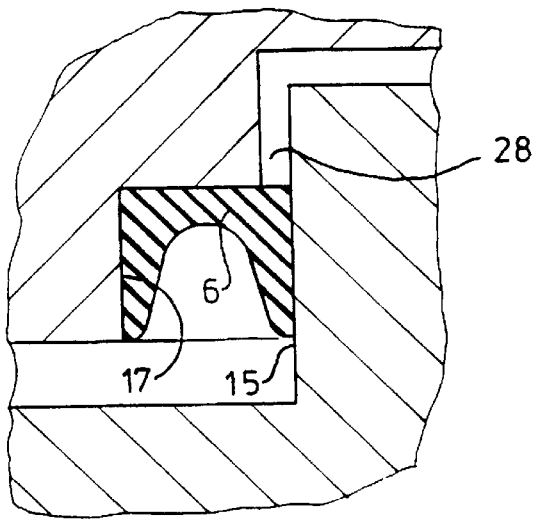
FIG. 2a shows a detail of FIG. 2.

FIG. 1 a part of a swivel is generally designated by 1. This comprises an inner part or member 2 and an outer part or member 3. One or both of these parts are rotatable around an axis 7. Between those parts 1 and 2 a gap is provided for taking up clearance and allowing relative rotation of parts 1 and 2. In this gap recesses 5 are realized, in this embodiment in outer member 3, to accommodate a sealing 6. This sealing engages inner member 2. If pressure is exerted at fluid cavity 4 outer member 3 will displace in the direction of arrow 8 whilst inner member 2 will displace in the direction of arrow 9. Because of that the spacing between two members will increase and can result in failure of sealing 6 by extrusion of the sealing material because of exerted fluid pressure.

As non limiting example, the following values can be given: In a 500 mm diameter swivel the gap between the inner and outer members will be about 0,25 mm. If the pressure is increased to about 300 bar the spacing will be about 0,75 mm. In a 1,500 mm swivel the gap is usual 0,5 mm. This gap will increase at a pressure of about 300 bar to 2,0 mm.

In order to prevent the necessary stiffening of the swivel members to reduce the movement of inner member 2 from outer member 3 in FIGS. 2–5 several proposals are shown which will be discussed below.

Figure 2B:
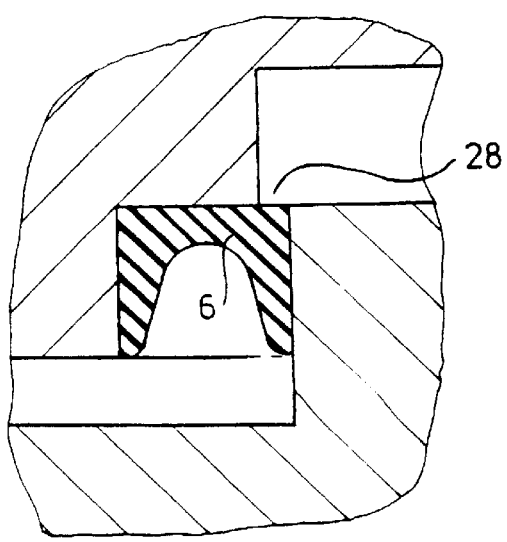
Figure 2C:
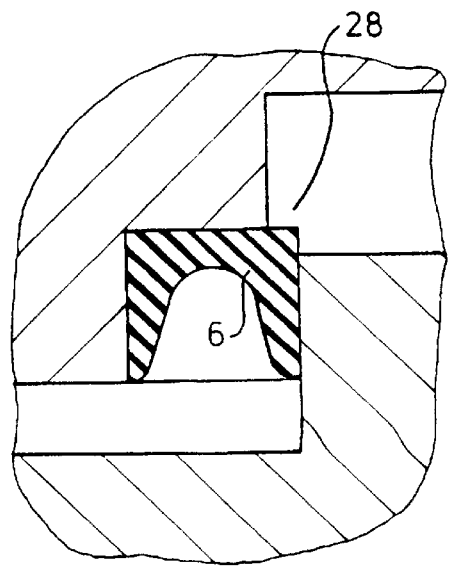
Figure 4:
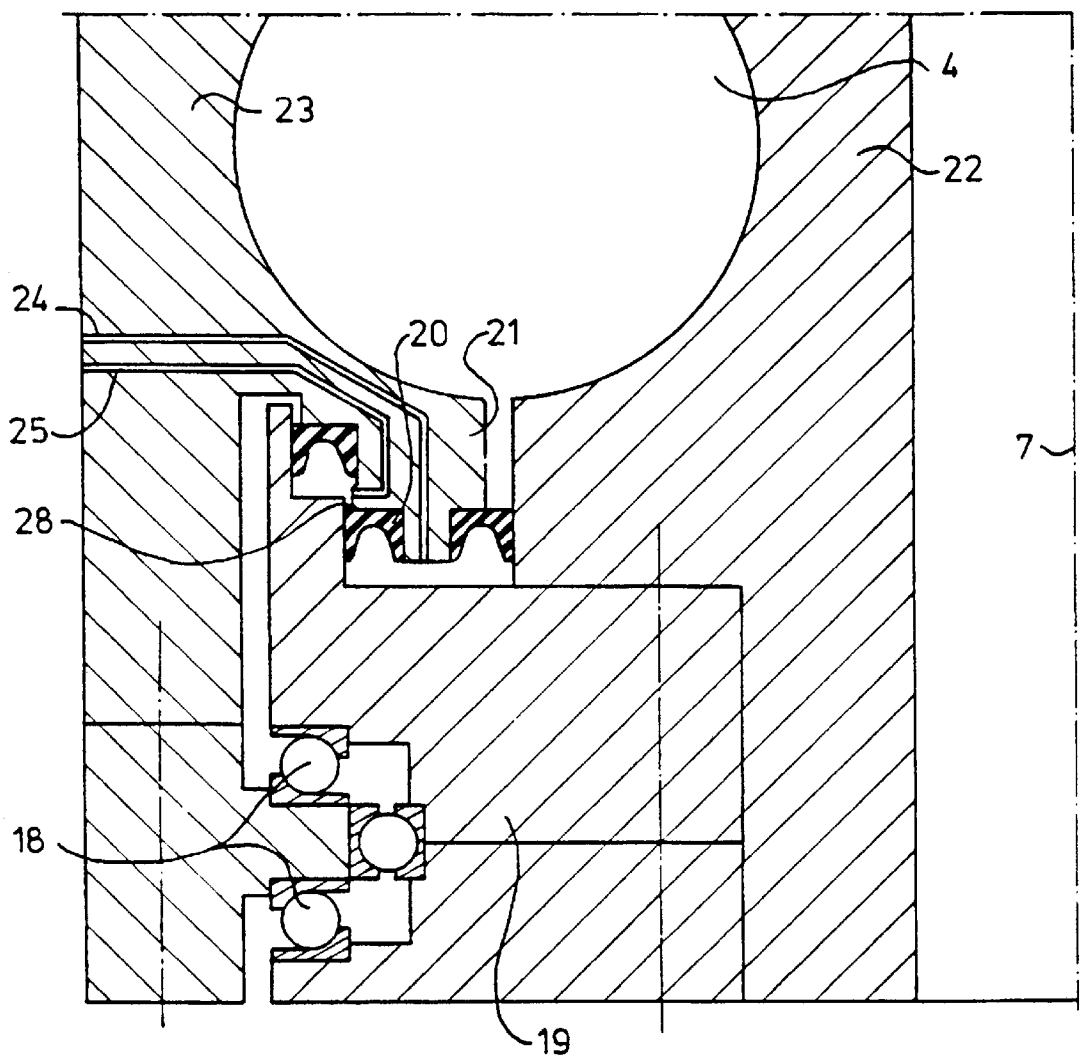

In FIG. 2 the inner member is indicated by 12 which the outer member has reference number 13. Outer member 13 is provided with a substantially L-shaped extension 11 having a leg connected to outer member 13 as well as a free leg 14. Free leg 14 has an inner face 15. Inner member 12 is provided with a substantially L-shaped extension 10 having a leg connected to inner member 12 as well as a free leg 16, which is provided with a recessed part having an inner face 17. Between inner face 17 and inner face 15 sealing 6 is provided. As is clear from FIG. 2a recess for the sealing 6 of which inner face 17 is a part, extends short from the free extremity of the free leg 14 such that there is some overlap resulting in a well defined gap 28. Although not preferable, the free extremity of the free leg 14 can also be such that there will be no overlap or even a slight undercut which is shown in FIG. 2b respectively FIG. 2c, still resulting in a well defined gap 28.

If the pressure in cavity 4 exerted by the fluid is increased from zero level, the outer member 13 will move in outward direction whilst inner member 12 will move in inward direction. This will result in moving together of inner faces 15 and 17. Gap 28 has to be designed such that no contact will arise during the highest pressure available in fluid cavity 4. This means that the loading on sealing 6 and the tendency to extrude through gap 28 will decrease during increase of the pressure because the width of gap 28 decreases. Because the extrusion is counteracted, the service life of sealing 6 and consequently of the swivel will be improved. It has been found that it is no longer necessary to design the swivel on stiffness but one can confine to optimizing the position of the free leg 14 with respect to the sealing 6.

In FIGS. 3–6 further embodiments of the invention are shown. In the embodiment of FIG. 3 a sealing ring 20 is present in a recess of the outer arm 21, on a end face of said arm. The arm 19 which is connected to the inner part 22 of the ring-shaped member also comprises a recessed end face such that a cavity is formed radially outwardly from the first sealing ring 20. A bore 25 for leakage detection and recuperation is connected to said cavity through the wall of the outer part 23.

In the embodiment of FIG. 4 the inner part is again referred to by 22 whilst the outer part has reference number 23. In this embodiment the L-shaped arm 19 is provided on inner part 22 whilst the inverted L-shaped arm is provided on outer part 23 and is indicated with 21. Bearing means 18 are provided to secure the axial and radial position of outer part 23 with respect to inner part 22. In this embodiment a triple sealing arrangement comprising three piston or rod type sealing rings is provided. Between the first sealing 20 (seen in the direction of fluid pressure) and the second seal 20 a bore 24 is provided to inject an isolation fluid at a pressure equal to or higher than the fluid pressure. Such a bore 25 is also present in between the second ant the third sealing ring for detection and recuperation of any leakages of sealing 20. Also in this embodiment a gap 28 prevents extrusion of the second sealing ring which have to take the highest pressure load. Also the third sealing ring is provided with a gap 28 to prevent extrusion in the event the second seal has failed. The first seal has a normal gap which increases with the fluid chamber pressure, however, this seal is only loaded by the differential pressure between the barrier and the fluid chamber. When a constant barrier pressure is utilized, the first seal will only be subjected to a high differential pressure when the fluid chamber pressure is low or zero at which condition the gap of the first seal will be smallest.

Figure 5:
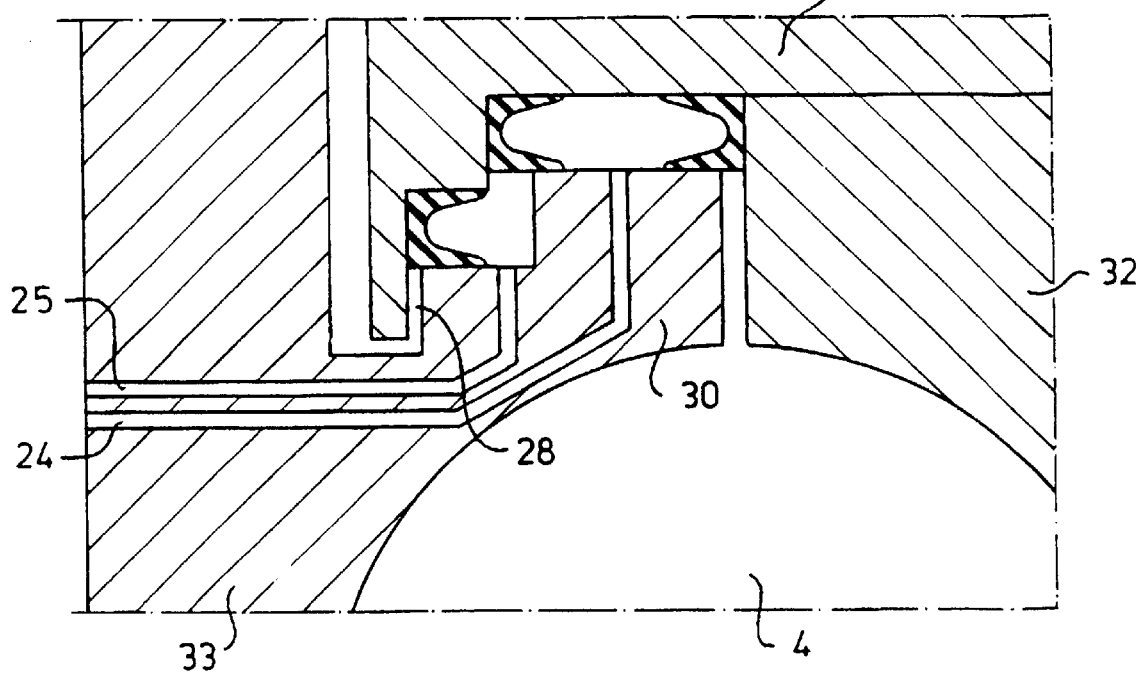

In FIG. 5 an embodiment is shown in which the inner part of the swivel is designated with 32 whilst the outer part has reference number 30. The L-shaped arm on the inner part 32 of the swivel is referred to by 29 whilst the L-shaped arm on the outer part has reference number 30. In this embodiment a triple sealing arrangement of face seal type sealing rings is used. An overlap of both L-shaped arms is provided between the second and third seal and behind the third seal to prevent extrusion of the second and third sealing ring.

Figure 6:
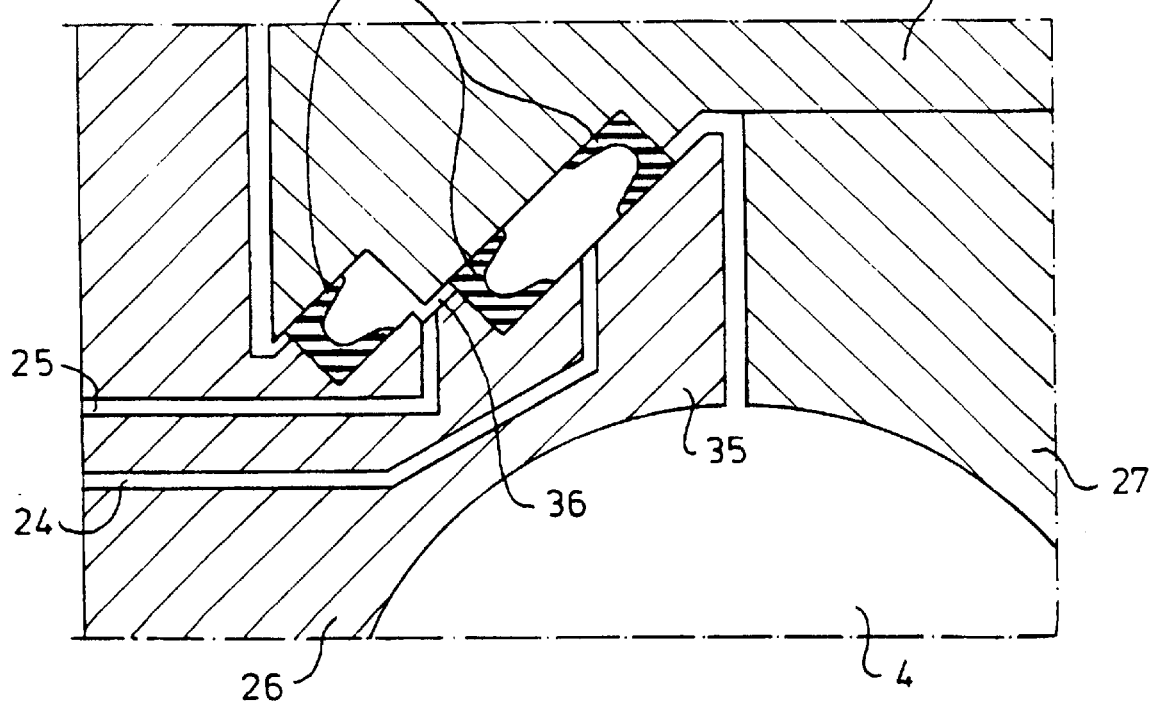

In FIG. 6 a further embodiment is shown wherein each arm has a slanting surface, the angle between the slanting parts of the arms being between 0° and 90° providing grooves for three conical type sealing rings. The inner part 27 and outer part 26 are provided with an arm 34, having a slanting surface and with an "inverted" slanting arm 35 respectively. Sealings 37 are provided extending at an angle in between 0° and 90° relative to the axis 7 of rotation of the swivel. Discharge bores 24, 25 are provided. Between the second and the third sealing 37 gaps 36 are provided which will decrease or substantially remain constant in size during increase of the fluid pressure in cavity 4.

The above described embodiments naturally also cover swivels with the centre line (axis of rotation) placed at the opposite side as presented in the figures or in other words the above mentioned inner swivel parts can be the outer parts and the mentioned outer parts the inner parts of the swivel.

Although the invention has been described above with reference to preferred embodiments it has to be understood that several amendments can be made without leaving the scope of protection conferred by the enclosed claims. By example it is possible to use any kind of sealing being a metal or plastic based, rod, piston, face or conical sealing. Combination of the several features disclosed for the different embodiments is within the range of a person skilled in the art.

What is claimed is:

1. Sealing arrangement between an inner member (2;12;22;26) and an outer member (3;13;23;27) of a swivel, which members are adjacent and can be rotated with respect to one another around a common central axis (7), and which members define between them at least one circumferentially extending fluid cavity (4) in communication with fluid lines through inner and outer member respectively, a circumferential gap being formed between the inner and the outer member in communication with said fluid cavity (4), the gap comprising a first gap section, a second gap section which is located at a different distance from the central axis (7) than the first gap-section, and an intermediate gap section, connecting the first and second gap sections, and extending in a generally radial direction, a sealing means (6;20;37) which is at least partly located in a groove of at least one of inner member and the outer member and which bridges a gap section to seal said cavity (4) the improvement being that the inner and the outer member in the area of the circumferential gap, each comprise a radially extending arm, the arms overlapping both in the axial direction and in the radial direction and defining the intermediate gap section (28,36) there between, the intermediate gap section (28,36) at least partly extending in the axial direction wherein the sealing means bridge the intermediate gap section (28,36) such that widening of the upstream part of the gap by pressure in the said cavity (4), reduces the width of the intermediate gap section and increases the pressure on the sealing means.

2. Sealing arrangement according to claim 1, wherein the sealing means comprises at least two sealing rings placed in the intermediate gap section.

3. Sealing arrangement according to claim 1, wherein each arm comprises an axially extending free leg (10,14), the sealing means being at least partly placed between said legs.

4. Sealing arrangement according to claim 3, a sealing means being provided on each side of at least one free leg (21).

5. Sealing arrangement according to claim 3, at least two sealing rings being placed between the free legs.

6. Sealing arrangement according to claim 3, at least one free leg having a stepped surface, forming at least one cavity wherein sealing means are positioned.

7. Sealing arrangement according to claim 3, at least one free leg comprising an end face directed generally parallel to the radial direction, defining a radially extending part of the intermediate gap section, at least one sealing means extending between the end face and an oppositely located surface.

8. Sealing arrangement according to claim 7, two sealing means extending between the end face and an oppositely located surface, a bore connected to a source of pressurizing fluid being in fluid connection with the intermediate gap section between the two sealing means.

9. Sealing arrangement according to claim 1, arm comprising a substantially wedge-shaped part having a slanting surface, the intermediate gap section being formed between the slanting surfaces of the arms.

10. Sealing arrangement according to claim 9, wherein a recess is formed in at least one of the slanting surfaces.

11. Sealing arrangement according to claim 2, wherein each arm comprises an axially extending free leg (10, 14), the sealing means being at least partly placed between said legs.

12. Sealing arrangement according to claim 11, a sealing means being provided on each side of at least one free leg (21).

13. Sealing arrangement according to claim 12, at least two sealing rings being placed between the free legs.

14. Sealing arrangement according to claim 4, at least one free leg having a stepped surface, forming at least one cavity wherein sealing means are positioned.

15. Sealing arrangement according to claim 5, at least one free leg having a stepped surface, forming at least one cavity wherein sealing means are positioned.

16. Sealing arrangement according to claim 2, each arm comprising a substantially wedge-shaped part having a slanting surface, the intermediate gap section being formed between the slanting surfaces of the arms.

* * * * *

UNITED STATES PATENT AND TRADEMARK OFFICE
CERTIFICATE OF CORRECTION

PATENT NO. : 6,234,540 B1
DATED : May 22, 2001
INVENTOR(S) : Frans Pieter Drijver et al.

It is certified that error appears in the above-identified patent and that said Letters Patent is hereby corrected as shown below:

Title page,
Item [22] should read as follows: -- [22] PCT Filed:   Dec. 16, 1997 --.+

Signed and Sealed this

Twenty-seventh Day of November, 2001

Attest:

*Nicholas P. Godici*

Attesting Officer

NICHOLAS P. GODICI
*Acting Director of the United States Patent and Trademark Office*